United States Patent [19]

Calta et al.

[11] Patent Number: 4,866,609
[45] Date of Patent: Sep. 12, 1989

[54] BYTE COUNT HANDLING IN SERIAL CHANNEL EXTENDER WITH BUFFERING FOR DATA PRE-FETCH

[75] Inventors: Salvatore A. Calta, Wappingers Falls; Thomas A. Gregg, Highland; Leon Skarshinski, Red Hook; Richard Strangwayes, Wappingers Falls, all of N.Y.

[73] Assignee: International Business Machines Corporation, Armonk, N.Y.

[21] Appl. No.: 248,273

[22] Filed: Sep. 21, 1988

Related U.S. Application Data

[63] Continuation of Ser. No. 854,646, Jun. 22, 1988, abandoned.

[51] Int. Cl.[4] ................... G06F 13/12; G06F 13/42
[52] U.S. Cl. ................................. 364/200; 370/82
[58] Field of Search ............ 364/200, 900; 370/43, 370/61, 82, 83, 99

[56] References Cited

U.S. PATENT DOCUMENTS

| | | | |
|---|---|---|---|
| 4,407,016 | 9/1983 | Bayliss et al. | 364/200 |
| 4,491,916 | 1/1985 | Vallhonrat | 364/200 |
| 4,546,429 | 10/1985 | Chan et al. | 364/200 |
| 4,562,533 | 12/1985 | Hodel et al. | 364/200 |
| 4,564,900 | 1/1986 | Smitt | 364/200 |
| 4,616,337 | 10/1986 | Sheth | 364/900 |

Primary Examiner—David L. Clark
Attorney, Agent, or Firm—W. S. Robertson

[57] ABSTRACT

A channel subsystem with a conventional serial extender link that causes communications between a channel and a control unit to be delayed by the additional time to transmit a message in one direction and to transmit an acknowledgement in the other direction. The channel subsystem also has a buffer and associated components (called a channel outboard box) that are used for prefetching data from processor memory or from a peripheral device without waiting for the acknowledgment routines that are commonly used on both an interlocked data transfer and a non-interlocked transfer (called data streaming). A system of counters and other components and associated operations maintain the correct byte count that would otherwise be maintained in a system without the prefetch buffer and with only a short serial link. A system of count and status frames provides for sending byte count and other status information between the channel and the outboard box.

9 Claims, 5 Drawing Sheets

BYTE COUNT HANDLING IN SERIAL CHANNEL EXTENDER WITH BUFFERING FOR DATA PRE-FETCH

RELATED APPLICATIONS

This is a continuation of application Ser. No. 854,646, filed June 22, 1988, now abandoned.

FIELD OF THE INVENTION

This invention relates to a data processing system with improved apparatus for interconnecting a control unit having a parallel bus and a data channel operating with a serial link. More specifically, the invention relates to a method and apparatus for improved byte count handling in a serial channel extender link having a buffer at its control unit end that is used for prefetching data and for other operations.

Introduction

1. Components of an I/O Subsystem

In a data processing system that will use this invention, an input/output (I/O) device such as a disk storage device is connected to a central processor main memory through a bus which is one of the components that are collectively called a data channel. "Input" is a data transfer in the direction from the device controller to the channel and "output" is a data transfer in the direction from the channel to the controller. The data channel includes a processor called a channel processor that handles data transfers at the central processor end of the bus. When the point of view is from a device, it is conventional to use the term "channel" to mean either the bus or the channel processor or both. A data processing system commonly has several channels.

The channel processor cooperates with the central processor for these data transfers, for example to get the information that is needed to start a channel operation and later to report the status of a completed data transfer. These functions can be allocated among the channel processor, the central processor, and additional processors in ways that are not specifically relevant to this invention.

At the device end of the bus, data transfers are handled by a processor called a device control unit or controller. The channels, devices, control units and related components are called the channel subsystem.

2. Messages in Serial and Parallel Form

This invention is useful in a system in which the bus is formed partly as a cable having a number of parallel conductors and partly as a serial link having one input line and one output line. The term "bus" will be used to refer to either or both the serial bus and the parallel bus. The term "message" will be used where it will be helpful to generalize the unit of data that is transferred over both the serial and parallel parts of the bus. On the parallel bus, a message is represented by the binary signals on all of the conductors of the cable or, more conveniently, by the particular signals that are relevant to a particular operation that is being described. On the serial link, a message is carried in a multi-bit serial frame. In some systems, a serial frame carries approximately the message bits of the parallel bus or an encoded form of these bits.

A general object of this invention is to provide new serial frames that carry additional information for new functions but to preserve the conventional protocol used by the controller on a parallel bus without a serial link. A more specific object is to provide the byte count information that the channel and the control unit exchange on a conventional parallel bus, and it will be helpful review the structures and operations of conventional parallel and serial busses.

3. The Parallel Bus and Standard Interface Protocol

The physical structure of the preferred parallel channel is well known, and the preferred protocol for operations on the bus is described in "IBM System/360 and System/370 I/O Interface Channel to Control Unit Original Equipment Manufacturers' Information", GA22-6974. This publication will be cited as "OEMI."

A message on the parallel bus has a field that carries one or several bytes of data in a data transfer and carries an address or a command or status in other operations. The lines that carry this field from the channel to the controller are called Bus Out and the lines from the controller to the channel are called Bus In. If the field is more than one byte wide, the bytes are called Bus 0 In, Bus 1 In and so on. (A byte is commonly 8 bits, but from a more general standpoint a byte is the smallest multi-bit unit of data handled by the system.) A message also has a field of control bits that tell the significance of the data on Bus In and Bus Out: that the field can be interpreted as data, address, status or command or in the absence of such a signal is not valid. As a relevant example, tags called Service Out and Service In are raised and lowered by the channel and the control unit respectively to signal that Bus Out or Bus In carries a valid data byte and to acknowledge that the byte has been received.

From the standpoint of messages on the bus, a data transfer proceeds in three phases: initial selection of an I/O device by the channel, the data transfer, and an ending sequence in which the controller reports the success or failure of the operation. The operation to be performed is defined in part by a control block that is called a channel command word, CCW. The CCW's for a data transfer are called read, write, and read backwards. Other CCW's provide the information for related operations, for example positioning the read/write mechanism of a disk at the beginning of a unit of data where the read or write operation is to take place.

During a write operation, the controller requests each byte it receives and during a read operation the channel acknowledges each byte it receives. The ending sequence permits the controller to report that the operation was successful or that some failure occurred. For example, the controller might receive a byte but be unable to actually write the data on the device, and ending status would indicate that some further action is required.

4. The Serial Link and Serial Frame Format

The physical structure of a serial link is also well known. An article by Lynch and Thorn, "Serial Channel to I/O Interface", IBM Technical Disclosure Bulletin, January 1977, pages 3139-3143, describes a serial link that is connected into a parallel bus system as an extender for the parallel bus. A serial link is sold as the IBM 3044 channel link extender. See also application Ser. No. 700,355 of Kenneth J. Fredericks et al., now U.S. Pat. No. 4,712,176 issued Dec. 12, 1987.

A serial link has an input line and an output line and it has receiver and transmitter apparatus at each end that handle the serial frames. The input line and the output line together are called the link connection. The preferred link connection has two optical fibers that carry optical signals. Equivalently, the link can have copper conductors that carry electrical signals or it can have a few lines in each direction for carrying several frames in parallel or for carrying tags separate from frames. The apparatus at the channel end of the link handles the parallel bus to the channel in the same general way that a control unit would handle this bus in a system without a serial link. Similarly, the apparatus at the control unit end of the link handles the parallel bus to the control unit in the same general way that a channel would handle this bus in a system without a serial link.

Various names have been given to the apparatus at the ends of the serial link. In this specification the apparatus at the channel end of the link will be called the inboard box and the apparatus at the controller end of the link will be called the outboard box. The names are related to the functions of the apparatus but they will also be used to mean apparatus of this type generally.

5. Byte Count, Device Count, and Residual Count

An object of the invention is to maintain an accurate byte count, and it will be helpful to review the conventional byte count operations of a channel and a control unit. In the conventional channel and control unit, count control is the same for both input and output operations. For both read and write, the channel has a byte count which is extracted from the Channel Command Word (CCW). The channel will try to send this number of bytes to the control unit on a write operation and to receive this number of bytes from the control unit on a read operation.

The control unit also has a byte count, and the control unit will try to send this number of bytes to the channel on a read operation and to receive this number of bytes from the channel on a write operation. The byte count for the control unit is determined by its physical characteristics or by its recording medium. For example, a reader/punch for an 80 column card will always try to send or receive 80 bytes, one byte for each column of a card.

As another example, the byte count for a tape drive is adapted to the fact that the length of the tape is essentially infinite. On a tape write (output) operation the control unit byte count is the length of the tape. On a tape read operation, the byte count for the control unit is determined by the record length on the tape medium itself.

A third example is a disk storage control unit/device: formatting the disk establishes specific byte counts for input and output operations.

The outcome of each I/O operation is communicated by the channel to the I/O control program via a control block called the channel status word (CSW). The fields of interest are the Residual Byte Count and the Incorrect Length Indicator.

With respect to the residual byte count and the incorrect length indicator, all I/O data transfers (for both input and output operations) can terminate in only three different ways.

(1) The CCW count equals the device count: in a write operation the control unit has transferred the exact number of bytes that the channel will accept, or on a read operation the control unit has stopped transferring data when the channel has received the number of bytes specified in the CCW.

In this case the channel sets the Residual Byte Count to zero, indicating that all of the data for the I/O operation has been transferred. The channel sets the Incorrect Length Indicator in the CSW to False (zero), indicating that the control unit did not ask for or try to send more bytes than the count in the CCW.

(2) The CCW count is smaller than the device count: in a read operation the control unit has tried to send more bytes than the channel will accept, or on a write operation the channel has transferred the number of bytes specified in the CCW and the control unit has tried to ask for more data (by raising Service In or Data In instead of Status In). The channel will respond to Service In or Data In by raising Command Out indicating to the control unit that data transfer has been terminated.

In this case the channel sets the Residual Byte Count in the CSW to zero (there is no more data to be transferred). The channel also sets the Incorrect Length Indicator in the CSW to True (one), indicating that the channel had to terminate the data transfer by raising Command Out.

(3) The CCW count is larger than the device count: the control unit has stopped data transfer before the channel has transferred the number of bytes specified by the CCW. (The control unit stops the write operation by raising Status In instead of Service In or Data In.)

In case 3, the channel sets the Residual Byte Count in the CSW to the number of bytes which were not transferred: the original CCW count minus the number of bytes transferred to or from the control unit. The channel also sets the Incorrect Length Indicator in the CSW to True; Status In was received early as shown by the fact that the Residual Byte Count was non-zero.

SUMMARY OF THE INVENTION

A general object of our invention is to maintain a correct byte count in a system in which the control unit and the channel are separated by a serial link and an outboard box containing a data buffer. These components prevent the direct exchange of byte count information that has been described so far. For a summary understanding of our invention, messages on the serial link and on the parallel bus are transferred in approximately the way described by Fredericks et al. (differences will be described later).

The data buffer of the outboard box is used in prefetching data from main processor memory on a write operation and/or from a control unit on a read operation. The operation is called "prefetching" because the channel does not wait for the conventional acknowledgement from the outboard box on a write operation and the outboard box does not wait for an acknowledgement from the channel on a read operation.

The channel front end can be a physically distinct component that cooperates with a conventional channel. Alternatively, the channel front end can be logically and/or physically integrated with the channel processor. From the viewpoint of the outboard box, both embodiments are identical. For the most part, our invention will be presented from the viewpoint of outboard box and the term "channel" will mean both (1) a channel and channel front end that are logically and/or physically separate and (2) an equivalent channel that includes components and functions of the channel front end. The terms "separate channel front end" and "integrated channel" will be used where one of these two embodiments is described further. For this summary, the separate channel front end can be thought of as being generally similar to the outboard box.

The channel has a counter that will be called a frame counter and the frame counter keeps track of the number of bytes that have been sent or received but not yet acknowledged. The channel also maintains the conventional byte count in the CCW. The channel stops transferring data from processor memory when the frame counter indicates that the buffer of the outboard box may be full or after a preset number of bytes have been transferred (or when the CCW count has been exhausted, as is conventional). On a read operation the channel uses the frame counter to detect a possible overrun of the channel buffer, as will be discussed later in this summary.

In a system with a separate channel front end, the channel maintains the byte count field of the CCW, as is conventional, and the channel front end maintains the frame counter. The channel front end raises and drops the data transfer tags on the parallel bus (as a control unit would otherwise do) to maintain the data transfer at a high rate. It also uses conventional tag sequences to stop or delay the data transfer when the frame counter indicates that the buffer may be full. In an integrated system the channel sends data frames directly. In both embodiments the outboard box provides the actual acknowledgement to the channel after the control unit has made a conventional acknowledgement on the parallel bus to the outboard box.

An Interlocked Write Operation

In an interlocked write operation the channel fetches bytes from main processor memory, forms these bytes into serial frames as is conventional, and transfers the bytes to components of the outboard box that store them in the buffer. The outboard box does not acknowledge the transfer at this step of the operation, but the channel continues to send bytes to the outboard box at a high data rate. Transferring bytes without an immediate acknowledgement speeds up the data transfer, but it complicates the problem of maintaining the byte count.

The outboard box has counters that tell the number of bytes that have been received from the channel, the number of bytes that have been transferred to the control unit, and the number of bytes in the buffer. On a write operation the outboard box uses the counters for controlling the transfer of data from the buffer to the control unit. The outboard box also uses the counters for maintaining the byte count.

The outboard box sends an acknowledgement frame to the channel only after it has sent the byte to the control unit. In one embodiment the outboard box sends an acknowledgement frame for each byte that is sent to the control unit. The acknowledgement frame may be an empty data frame.

In one implementation of the invention, the outboard box sends an acknowledgement frame that contains a count of the number of bytes that have been sent to the control unit. Preferably, the system operates with a fixed data block size.

An Interlocked Read Operation

On an interlocked read operation, the buffer in the outboard box can be used in either of two ways. In one embodiment, the buffer in the outboard box is bypassed and bytes are sent directly to the channel, one byte in each frame, as fast as they can be received from the control unit sent from the outboard box. Even when the buffer is not used, there is a buffering effect in the channel subsystem because the long serial line holds several bytes.

Preferably, the channel has a buffer for the input bytes, as is conventional. The channel steps the frame counter as bytes are requested and as bytes are received, and the channel stops acknowledgement frames to slow the outboard box when the frame counter indicates that the channel buffer is approaching an overrun.

In one implementation of our invention, bytes from the control unit are stored in the buffer of the outboard box until a predetermined number of bytes have been stored, and these bytes are sent to the channel as a block. The byte count operations will be described in detail later.

In one embodiment of our invention, the channel sends the outboard box the byte count from the CCW. In one implementation, the channel sends incremental counts as bytes are sent to the buffer.

Ending Sequence

When the data transfer has been completed, the outboard box forms a status frame that tells the channel whether the control unit raised status in after the last byte or whether the outboard box raised command out to end the transfer. The outboard box also sends information for the residual count to the channel. These operations preserve the byte count that would otherwise occur in a parallel channel without the channel extender link or the buffer.

Data Streaming

Data streaming operations can be handled in either of two modes. In one mode, the buffer is bypassed. Data streaming is inherently fast, and the buffer does not directly improve the speed of the data transfer. In a second mode, the buffer is used on a read or write operation. The outboard box transfers bytes from the control unit to the buffer and acknowledges the bytes in the way already described for an interlocked read operation. This operation provides an acknowledgement to the control unit after only one or a few bytes have been read. By contrast, in the first mode—bypassing the buffer—the control unit does not receive its first acknowledgement until a number of bytes have been propagated on the serial line to the channel and an approximately equal number of acknowledgement bytes have been propagated on the serial line from the channel. Some control units count the number of bytes that have been sent without an acknowledgement and signal an error if this count reaches a predetermined value that usually corresponds to a serial link of moderate length. This feature of our invention makes data streaming possible in systems with long serial links.

Other objects and features of the invention will be apparent from the detailed description.

THE DRAWINGS

THE PREFERRED EMBODIMENT

1. The System of FIG. 1

Figure 1:
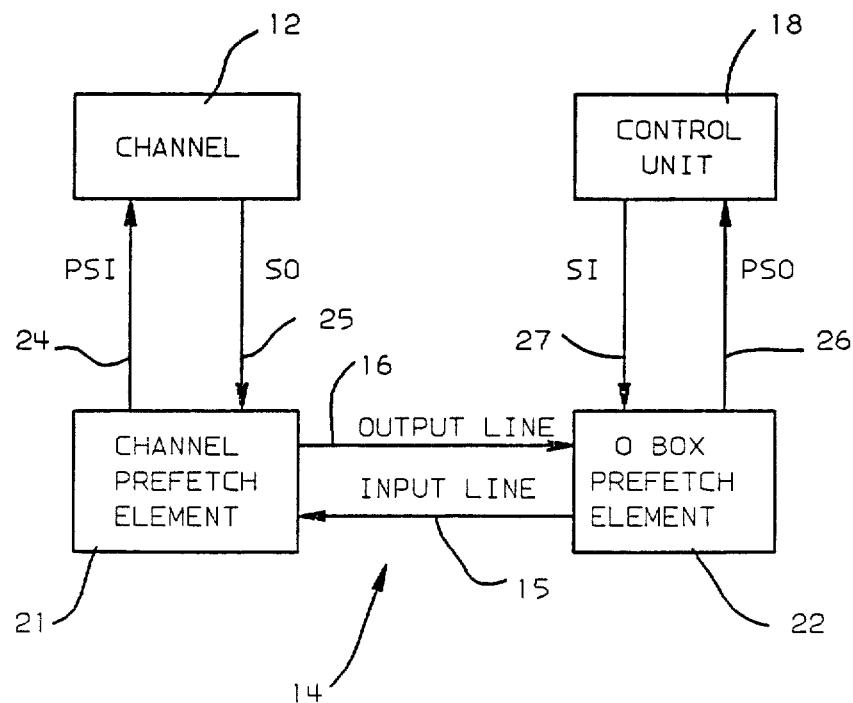
FIG. 1 is a block diagram of a channel subsystem showing the general flow of data between a channel and a controller in a system using the channel front end and channel outboard box and data prefetch elements of our invention.

FIG. 1 shows a channel 12, a bidirectional serial link connection 14 having an input line 15 and an output line 16, and a control unit 18 for a device that is not shown. The link connection is conventional as already described. The channel is connected to a central processor and to a central processor main memory that are conventional in their relationship to the components of FIG. 1 and are not shown. These components of FIG. 1 are well known. Modifications to the conventional channel are described in section 11.

FIG. 1 also shows the prefetch element 21 of the channel front end and the prefetch element 22 of the channel outboard box. The channel prefetch element 21 and the channel 12 are interconnected by the input lines 24 and output lines 25 of the standard interface. Similarly, the outboard box prefetch element 22 and the control unit 18 are interconnected by a set of input lines 26 and a set of output lines 27 of the standard interface.

The output lines 25 from the channel have the legend SO for the tag line Service Out which is one of the signals carried by the bus during a data prefetch operation. Similarly, input lines 27 from the control unit to the outboard box prefetch element have the legend SI for the tag Service In. Input lines 24 have the legend PSI standing for pseudo Service In, and output lines 26 have the legend PSO standing for pseudo Service Out. The channel prefetch element forms tag PSI and the outboard box prefetch element forms the tag PSO as part of the operations that will be described later. The channel responds to PSI and the control unit responds to PSO in the same way these components would otherwise respond to Service In and Service Out in a system without the serial link.

During a read operation, the outboard box and the control unit communicate with tags PSO and SI to transfer data bytes from control unit 18 and the device to the outboard box 22 at a speed that is appropriate to these components. The outboard box optionally stores the bytes in a buffer (as described later) and transmits the data over the input line to the channel front end. These two parts of the read operation proceed independently so long as there is data to be transferred from the device and the buffer has empty locations to receive data from the control unit and bytes to be transferred to the channel, and they proceed largely independently of the channel.

Similarly, on a write operation the channel front end prefetches data from processor memory and transmits it in serial frames to the outboard box. The outboard box converts the data from serial to parallel, and the prefetch element stores the data in the buffer memory and then transmits it to the control unit, using the tags PSI and SO.

Alternatively, connections 24, 25 between the channel and the channel prefetch element may be a nonstandard interface for a particular channel, or the channel and the channel front end can be physically and/or logically integrated as already explained. Similarly, the channel outboard box may be integrated with a control unit that operates with the channel according to a standard protocol and has register positions and/or signal lines that correspond to the lines of the standard interface 26, 27.

2. The Components of FIG. 2

Figure 2:
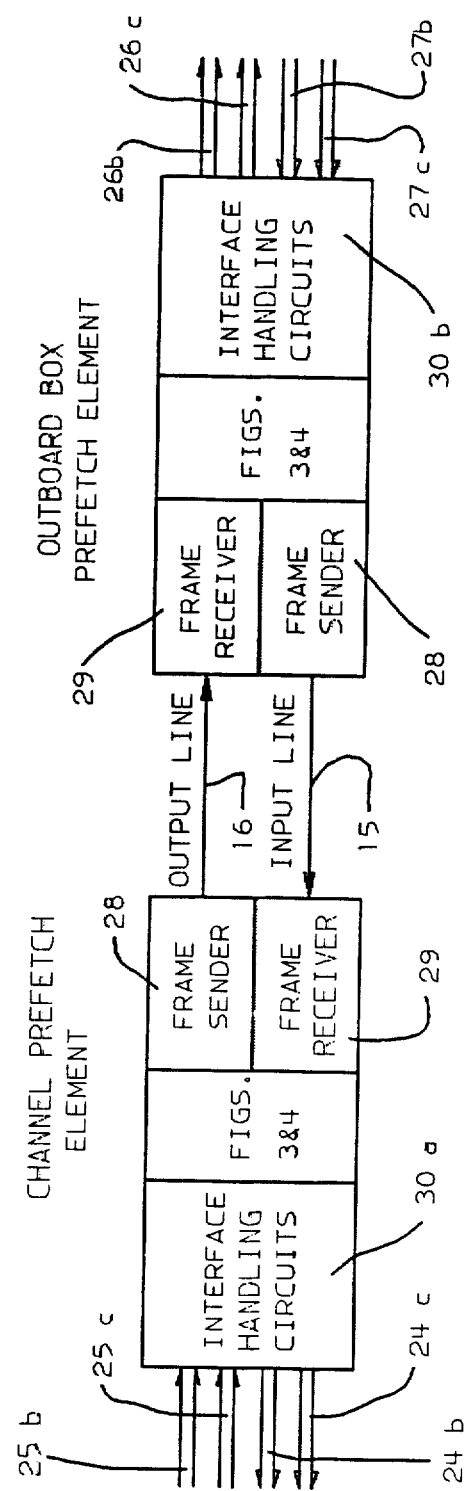
FIG. 2 is a block diagram showing components that interconnect the channel front end and channel outboard box with the serial link and with the parallel bus.

FIG. 2 shows the components of FIG. 1 in further detail. Parts 24–27 of the parallel bus are further divided with suffix "b" identifying Bus Out, 25b and 26b and Bus In 27b and 24b and with suffix "c" identifying the outgoing control signals 25c and 26c and the incoming control signals 27c and 24c. From some standpoints, it may be helpful to think of these pairs of lines (e.g. 25b and 26b) as continuous between the channel and the control unit, as they are in a parallel bus without a serial link.

The channel front end 21 and the outboard box 22 each include a frame sender circuit 28 and a frame receiver circuit 29 for handling serial frames on link 14. Input line 15 and output line 16 of the serial link can be generalized as the incoming line to either frame receiver circuit and as the outgoing line from either frame sender circuit. These components of the channel front end and the outboard box are conventional and will be understood readily from the description of their operation.

The channel front end and the outboard box include interface handling circuits 30a and 30b that handle messages in the format of the parallel bus. The interface handling circuit of FIG. 2 receive the tag signals Service Out and Service In and produce the tag signals Pseudo Service Out and Pseudo Service In of FIG. 1. The interface handling circuits 30a of the channel front end 21 are substantially the circuits of the conventional control unit 18 which handle the parallel bus 26, 27, and the interface handling circuits 30b of the outboard box are substantially the circuits of the channel which handle the parallel bus 24, 25. Differences will be discussed later.

3. The Relation of FIG. 3 to FIGS. 1 and 2

Figure 3:
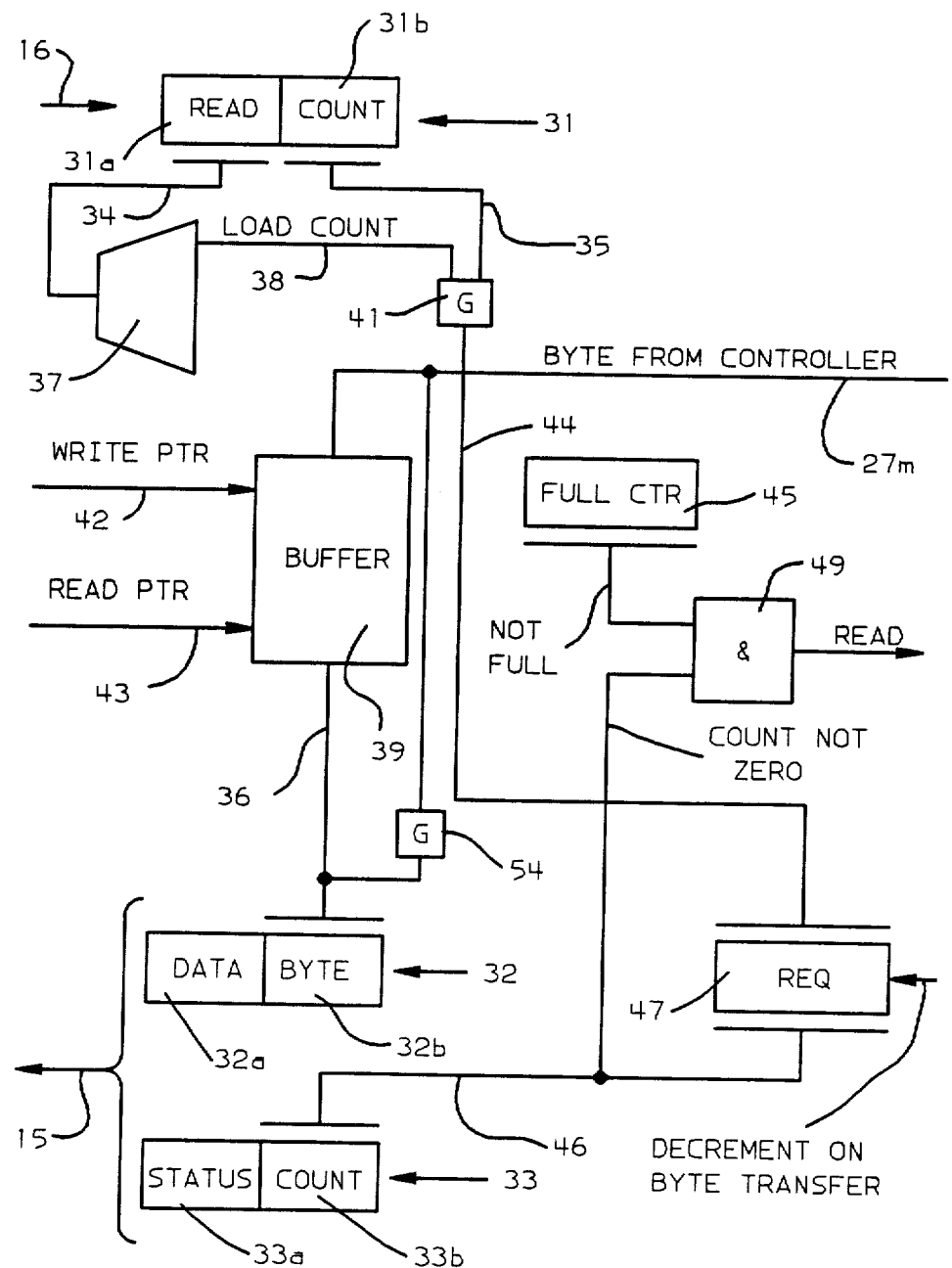
FIG. 3 is a diagram of the outboard box particularly showing the components of the prefetch element that operate during a read operation.

In FIG. 3, output serial line 16 of FIG. 1 is represented by an arrowed line directed to the right, and the input serial line 15 is represented by an arrowed line directed to the left. The frame receiver circuit 29 of FIG. 2 is represented in part by a serial frame 31. Frames have the general format that has been described in the introduction, and the drawing shows the command field and the data field with suffixes "a" and "b" respectively for the reference characters. The frame receiver circuit is further represented by an output bus 34 from the command field of the frame and an output bus 35 from the data field of a frame.

The frame sending circuit 29 is represented by two frames 32 and 33, and busses 36 and 46 that carry bytes for the data fields of outgoing frames. Frame handling circuits are well known and the frame sending and frame receiving circuits will be understandable from the description of the operations of the outboard box.

Bus 27m in FIG. 3 is an extension of Bus In 27 in FIG. 2. It is one byte wide and connects the circuit of FIG. 3 to the interface handling circuit 30b of FIG. 2. When the control unit places a data byte on Bus In 7 in FIG. 2, interface handling circuit 30b places the byte on bus 27m. In one embodiment of the invention, all bytes from the control unit are routed from bus 27m through gate 54 to an outgoing data frame 2.

In one embodiment of the invention that will be described in more detail later, the interface handling circuits signal that the byte is for the particular operation that is signified by the tags on bus 27c of FIG. 2. In an example that will be described in detail later, the interface handling circuits signal that a read operation is in data streaming mode. Bytes being transferred as part of a read operation are optionally routed on bus 27m to a buffer 39. These bytes are later read from the buffer and transferred on a bus 36 to the frame sending circuits. The buffer and the data paths will be described in detail later. Bytes from the control unit that are not part of a data transfer bypass buffer 39 as already described. An example of an operation that bypasses the buffer is the exchange of information that takes place for initial selection of the I/O device: only a few bytes are transferred and there is ordinarily no reason to use the buffer.

4. The Serial Frames

As is conventional, the command field has a binary code that tells the significance of the data field. A conventional decoder circuit 37 receives the command field 31a on bus 34 from an incoming frame 31 and produces a signal on one or more lines to control gates for the operation that the the command calls for. For some (or all) operations, the command code in field 31a is transferred to a register that provides the input to the decoder independently of the contents of the most recently received byte on line 16. For the read operation of FIG. 3, decoder 37 produces an output on a line 38, Load Count. This signal opens a system of gates 41 to transfer the contents of the data field 31b to circuits connected to the output of the gate. Gate 41 is conventional and commonly comprises an AND circuit for each line of buss 35. The specific operation will be described later.

Only a few commands are needed, and the preferred system uses a three bit command field that provides up to eight frame formats in each direction, as is conventional. The format for outbound frames includes commands identifying that the data field contains (1) data from bus out 25b, (2) tags from the standard interface 25c, (3) count frames (as in FIG. 3) that in some embodiments are divided into (4) an ending count and (5) an intermediate count, and (6) other control information. Other control information includes designating a forthcoming operation as a data transfer or not a data transfer (a non-data transfer bypasses the buffer), designating a forthcoming data transfer as a read or a write operation and as in either an interlocked mode or data streaming mode. In FIG. 3, frame 31 illustrates both the ending count frame and the intermediate count frame which have similar connections to bus 44 and differ only in the command code in field 31a.

The format for inbound frames includes commands identifying that the data field contains (1) data from Bus In 27b, (2) tags from the standard interface 27c, count frames that in some embodiments are divided into (3) a residual count frame and (4) a count check frame, and (5) status from the outboard box. (The outboard box status frame (5) is not the conventional device status on the parallel bus, which is sent on the serial link as a data frame following a corresponding tag frame.)

The outbound and inbound data frames carry data from Bus In and Bus Out respectively. The outbound and inbound tag frames carry the tags that are used in initial selection and ending sequence. These frames are similar to the Lynch and Thorn publication and will be understandable from the description of data transfer operations.

The data field of the inbound status frame includes three bits that will be used in the operations described later: a bit LBS (last byte sent), a bit COS (Command Out sent), and a bit RTC (read transfer check). Other bits in the status frame, for example a parity error bit, are not relevant to the byte count operations.

The data field of the outbound control frame has two bits that are used in the operations described later: a bit IN which identifies that an operation is for input or for output, and a bit CNTL which identifies that the following frames are for data transfer or are for the control operations required for initial selection or ending sequence.

It is known to begin a data transfer with a frame, called a header, that contains a command field, associated fields such as a start field and a check bit field, but no data. Thereafter, a series of data frames are sent without repeating the command field. This sequence of frames is equivalent to a single frame having a number of bytes in the data field, and the description will continue to be presented in terms of a frame having a command field and a data field without loss of generality.

Note that the term "data" is used to distinguish field 31b from command field 31a and that the term is also used to distinguish a frame with a data command code from a frame with a command code for tags, counts, or control information. The CNTL bit in a command frame establishes a further distinction between the kinds of data in a data field. CNTL is set to one binary value (0 or 1) for a data transfer and to the other value during initial selection and ending sequence. During initial selection and ending sequence, the data field of a data frame carries information such as a command that is identified by a tag frame. The control frame is transmitted with the CNTL bit set to the appropriate value at the beginning of each of the phases of an I/O operation, and the outboard box stores the value of this bit and uses it in interpreting the data fields of data frames. (Or additional command codes can identify that the data is for a particular operations, as is conventional.)

5. The Buffer of FIG. 3

The data buffer 39 of the data prefetch element temporarily holds data being transferred between main processor memory and the controller (in either direction). Buffer memories are well known and the buffering function for the prefetch elements can be implemented in various ways. The preferred buffer is one byte wide. (More generally, the term "byte" signifies a unit of data that is fetched or stored in one memory access operation; ordinarily, buffer 39 will have the same width as Bus In and Bus Out, which is one or two bytes.) The buffer has a write address pointer 42 and a read address pointer 43 that are implemented as circular counters that are incremented as read and write operations proceed. These counters are conventional, but in one embodiment of this invention they are used in the byte counting operations, as will be described later. Conventional buffer components keep the read address from being advanced past the write address.

The buffer has a counter 45 called the Buffer Full Counter. The counter is connected to be reset to all 0's (or other suitable reference value) at the beginning of a read operation with prefetch. Thereafter, the counter is incremented when a byte is stored in the buffer and decremented when a byte is fetched from the buffer. These operations of the counter are conventional and the details of the associated components are not shown in the drawing. Thus, the count in the Buffer Full Counter equals the number of bytes in the buffer, and it tells whether the buffer is full or empty or partly full. On a read operation, the count held in Buffer Full Counter 45 is used to stop the operation of reading from the device if the buffer becomes full.

6. The Channel Counter and the Channel Operation for Byte Count—FIG. 5

Figure 5:
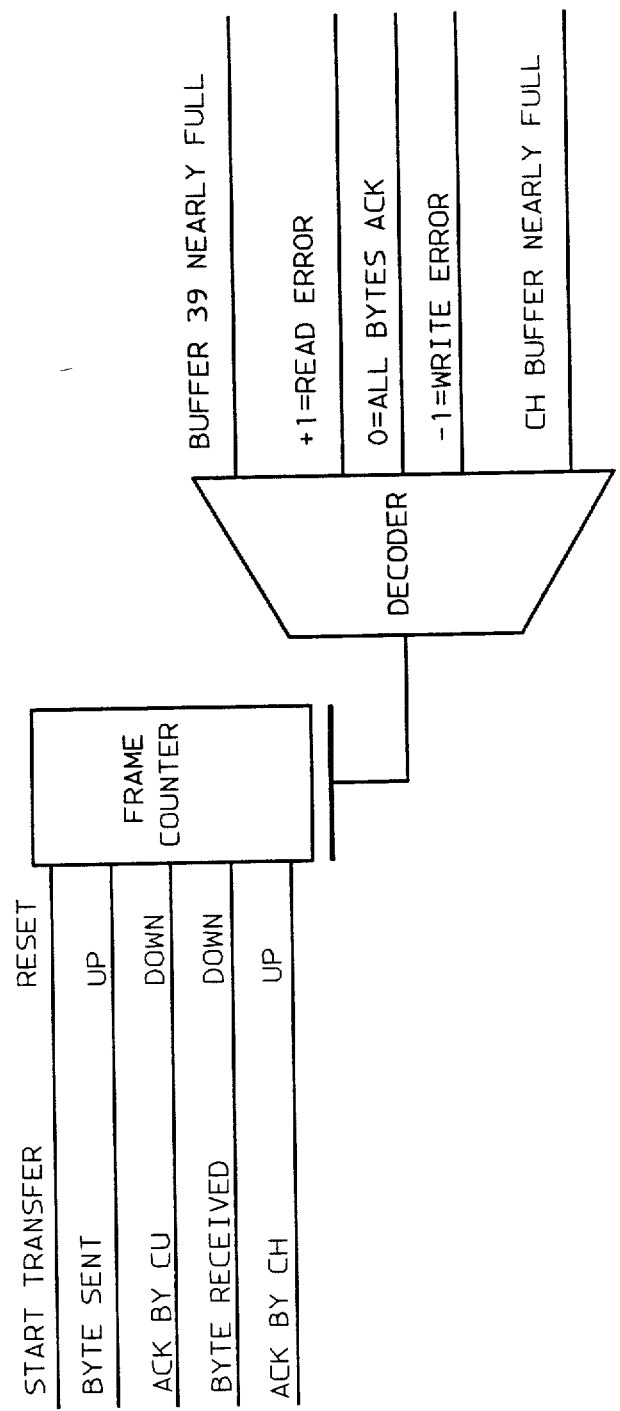
FIG. 5 is a diagram of components of the channel of FIG. 1.

The channel and the outboard box have suitable means for initiating an acknowledgement frame for a byte or a block of bytes. In one embodiment, the acknowledgement frame is an empty data frame. (An implementation that will be described later uses a count frame to acknowledge a block of bytes.) The apparatus for acknowledging bytes is similar to the conventional apparatus for acknowledging bytes on the parallel bus. (During a data transfer on the conventional parallel bus, the channel acknowledges a byte by sending Service Out or Data Out, and the control unit requests a byte by sending Service In or Data In. Bus Out is empty when an outgoing acknowledgment tag is sent, and Bus In is empty when an incoming request tag is sent.) FIG. 5 shows the modification to the conventional apparatus of the channel.

The channel has an up-down counter that will be called a Frame Counter. The channel resets the Frame Counter to 0 at the beginning of either a write operation or a read operation. On a write operation the channel increments the Frame Counter when a byte is sent and decrements the Frame Counter when an acknowledgement is received. On a read operation the channel decrements the Frame Counter when it receives a byte and increments the Frame Counter when it acknowledges the byte. When all of the bytes that have been sent or received have been acknowledged, the Frame Counter is 0. If the Frame Counter is +1 on a read operation or −1 on a write operation, the channel has acknowledged more bytes than it has received, and the channel signals an error. On a read operation a predetermined count value signifies that the channel buffer is full or almost full, and on a write operation a predetermined count value signifies that the buffer in the outboard box is full or almost full.

As FIG. 5 shows, a decoder circuit detects these counter values and ranges of values. In response to the error signals, the channel starts conventional error recovery procedures. In response to the buffer full signals, the channel performs an operation that will be described later.

On a write operation, the channel compares the count in the Frame Counter with the size of the buffer in the channel outboard box and produces a signal Buffer 39 and stops sending frames when the count equals the buffer size. Buffer 39 is either full or nearly full, but can not be over run. (The number of bytes in the buffer is not known exactly at the channel because several acknowledgement frames may be on the serial input line 15.) The complement of the signal Buffer 39 Nearly Full means that buffer 39 is not full, and the channel sends frames to the outboard box while the buffer in the outboard box is not full and the CCW count is not zero. As an implementation of this compare function, the frame counter decoder detects a range of count values the correspond to a full buffer. If the Frame Counter is made the same size as the buffer, a count of all 1's signifies that the buffer is full (not represented in FIG. 5).

7a. The Counter System of FIG. 3

In one implementation of the invention, the outboard box is provided with a counter 47 which will be called a Request Counter for a read operation and a Data Sent Counter for a write operation. Preferably, the same counter performs both functions. When a count frame is received, the count is set into counter 47 or is added to the count already in counter 47. (An adder is conventional with counter circuits and is not shown in FIG. 3).

In response to the signal on line 34, field 31b of count frame 31 is gated to a bus 35 and entered into Request Counter 47. Logic circuits 49 respond to the non-zero state of Request Counter 47 and to the nonfull state of Buffer Full Counter 45 to enable the interface handling circuits of FIG. 2 to receive bytes from the controller (the count requested by the channel has not yet been met) and to store these bytes in the buffer (the buffer is not full). When a byte is stored in the buffer, Request Counter 47 is decremented. When the Request Counter reaches zero, the prefetch element stops the transfer from the controller.

Until the buffer is empty, the frame sender components of FIG. 1 fetch data from the buffer on bus 36, form the bytes into a serial frame 32, and transmit the serial frame on the input line 15 to the channel front end.

When a zero count is reached in Request Counter 47, the value held in the counter is gated to the frame sender circuit which forms frame 33 and sends it on the serial line 15 to the channel front end. If the read operation is to continue, the channel front end sends the outboard box another read frame 16.

7b. A Two-Counter System

These count functions can be implemented in two separate counters which will be called a channel pointer ChanPtr and an interface pointer, InPtr. ChanPtr is associated with bytes sent to the channel, and InPtr is associated with bytes received from the control unit. The suffix "Ptr" refers to the fact that the counts can be addresses in buffer 39 as will be explained in section 7c.

Preferably, the channel sends the outboard box the full CCW count in one frame. In the implementation of FIG. 3, the channel sends the outboard box a count that corresponds to a block transfer of several bytes and the channel sends other counts for a block transfer or for a partial ending block as the read operation proceeds.

Counter InPtr receives a signal when a byte is received and it counts the bytes transmitted on the parallel interface from the control unit to the outboard box. Counter InPtr is reset to 0 at the beginning of a data transfer operation (but not when a new CCW is fetched by the channel on data chaining). On a read operation it is incremented when a byte is stored in the buffer. On a write operation, it is incremented when a byte on the parallel bus has been sent to by the control unit.

On a read or write operation, the difference between the two counters is the number of bytes remaining in the buffer to be transferred to or from the control unit.

7c. A Short Counter System

On the read operation of FIG. 3, write pointer 42 holds the number of bytes received from the control unit and thus functions as InPtr. Read pointer 43 holds the number of bytes sent to the channel and thus functions as ChanPtr.

The byte count field of the CCW has a predetermined length that established the maximum number of bytes that can be transferred in the operation with one CCW. In the preferred data processing system, the byte count field of the CCW is 16 bits long and up to 64K bytes can be transferred with one CCW. Ordinarily, buffer 39 will be made smaller than the maximum number of bytes that can be transferred by one CCW and the buffer address will be shorter than the count field in a CCW. In this situation, the counters in the outboard box can be the length of the CCW byte count field or they can be shorter, for example 8 bits long. A shorter counter has the known advantage that its carry propagation circuits are much simpler than the carry propagation circuits for a longer counter of the same speed.

As an example in which counter 47 is 8 bits wide and the read channel byte count is 16 bytes wide, the read operation proceeds without a count frame until the count in the channel is less than or equal to the counter size. When the CCW count falls below the value that can be represented in ChanPtr, the channel sends the count in a final count frame. For this operation, a register EndPtr, is provided and the count in the count frame is loaded into EndPtr. The outboard box compares the write counter InPtr with EndPtr and begins the ending sequence when the last byte has been transferred from the control unit to the outboard box. EndPtr is analogous to request counter 47. When the outboard box receives a frame for the last count, it records this state in any suitable way, preferably by setting a latch. The outboard box handles the counters in the way already described, and additionally it compares the In Ptr and End Ptr in any suitable way to detect when the last byte has been transferred from the control unit. When the last byte has been transferred from the control unit the outboard box begins the ending sequence which will be described in section 10. The channel then sends the count in a final count frame. The final count frame is like frame 31 in FIG. 3 except that it is identified by different command fields 31a.

Preferably, as soon as the last byte has been received the outboard box can begin loading the buffer for a next data transfer before all of the bytes have been fetched from the buffer.

After counter ChanPtr reaches 255 it wraps around to 0 with the next byte where a longer counter would produce a carry out bit position 8. This situation is handled correctly by conventional buffer management techniques, and it is accurate to say that the write pointer is always greater than the read pointer. However, some faults can occur when the count wraps, and the number of bytes is sent to the channel as described later as a check that such a fault has not occurred. (If the fault is detected, conventional recovery techniques would be used.)

8. A Write Operation with Prefetch—FIG. 4

Figure 4:
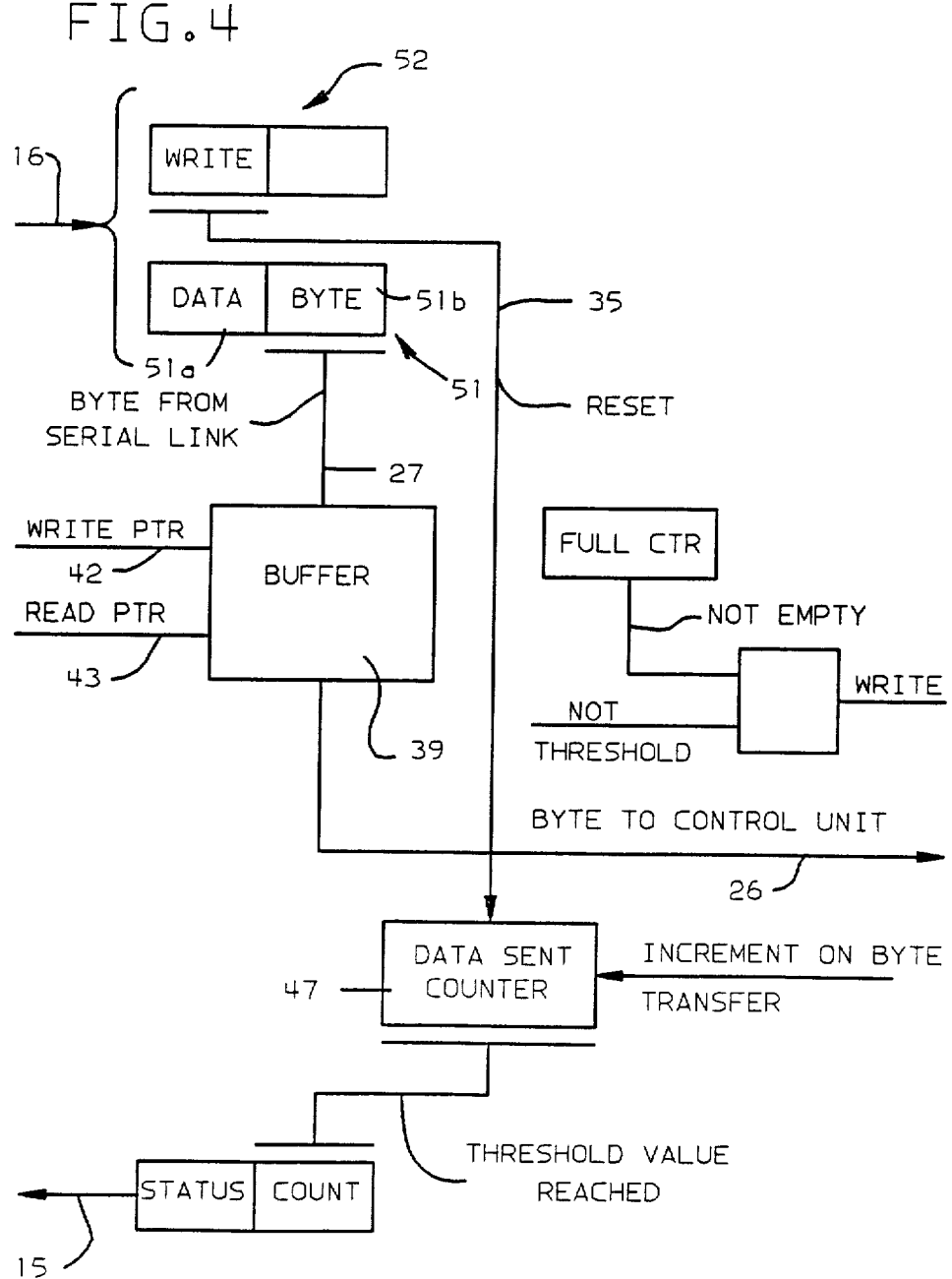
FIG. 4 is a diagram of the outboard box particularly showing the components of the prefetch element that operate during a write operation.

FIG. 4 is closely similar to FIG. 3 but shows the components and interconnections for a write operation. To begin a write operation, the channel front end sends the outboard box a frame 52 with a write command. This frame is decoded in the outboard box (as shown in FIG. 3) and the Data Sent Counter 47 is reset to zero. The channel front end then prefetches bytes from processor memory and sends one or more frames 51 to the frame receiving circuits of the outboard box. A frame 51 carries one byte or any suitable number of data bytes. The frame handling components convert the data portion of the serial data frame 51 to a parallel form and send it on bus 27 to the input register to buffer 39.

The outboard box transmits bytes to the controller so long as the buffer is not empty. Buffer 39 makes operating the channel front end substantially independent of the operation of the outboard box with the controller.

When a byte is fetched from buffer 39 and sent to the controller, the Data Sent Counter is incremented. When the count equals a threshold value, the count value is gated to the frame handling circuits to form field 53b of a status frame that is sent to the channel front end. If more data is to be transferred when the channel front end receives frame 53, it sends another frame 52 to continue the operation just described.

9. A Write Operation—With 2 Counters

If EndPtr is long enough to hold the longest possible byte count, the count in the CCW is sent to the outboard box and is loaded into EndPtr, as described for the read operation.

10. Ending Sequence

For the transfer of the last byte, the control unit conventionally raises Service In and the outboard box puts the byte on bus out and raises service out. As already explained, the control unit raises service in if it expects another byte or it raises status in if it does not expect another byte. If the control unit raises service in when the outboard box expects status in, the outboard box raises Command Out to stop the read operation, as the channel would do in a system without a buffered link. In response to Command Out, the control unit puts device status on Bus In and raises the tag Status In.

After the sequence just summarized, the outboard box sends a status frame to the channel with bit COS set to zero in the first example to show that Command Out was not sent to the control unit and with the COS bit set in the second example to show that Command Out was sent.

ChanPtr-InPtr is the number of bytes in the buffer. The outboard box calculates the residual count and sends it in an inbound residual count frame. For these calculations, the outboard box has a conventional arithmetic and logic unit or other suitable means that is well known and will not be described further.

When the write operation has been completed, the channel conventionally calculates the residual byte from the residual count of the outboard box and the residual count of the channel stores a status word in main processor memory. The status word contains the residual byte count and flags that tell whether certain errors have been detected.

11. The Channel Front End

The channel front end has the components described for the outboard box for communicating with the serial link and it communicates with the channel with the components that have been described for communicating between the outboard box and the controller. The channel front end has buffer 39 of FIGS. 3 and 4 and the frame counter already discussed.

12. The Channel

The channel has conventional means for handling the byte count. In addition, the channel is modified to form a byte count that includes bytes in the buffer of the two prefetch elements.

At the end of the data transfer, the outboard box sends the channel an ending status byte which contains information about the ending device count.

At the beginning of a write operation, the CCW contains the number of bytes to be transferred, and the data sent/request counter in the channel outboard box and the frame counter in the channel front end are both zero and both prefetch buffers are empty. As the channel front end prefetches bytes from the channel, the channel decrements its byte CCW count. At this point in the example, no bytes have actually been transferred to the control unit, and the count in the CCW is only an apparent number of bytes that have been transferred. The bytes for which the CCW count has been decremented are in the buffer of the channel outboard box, and the byte sent counter in the outboard box is zero because no bytes have been sent.

The outboard box accounts for these bytes. When the channel outboard box sends a byte to the controller, it decrements the frame counter. Thus in general the CCW and the frame counter give the correct byte count.

If the read operation terminates abnormally, the number of bytes actually sent by the controller equals the number decremented by the channel from the original byte count plus the count in the counters of the channel outboard box and the channel frame counter. The byte request count of the outboard box is sent to the channel front end in a status frame.

13. Other Operations—Data Streaming

In a conventional data transfer operation called data streaming, a byte is transferred with the tag Service In or Service Out and the other of these tags is used, as already described, but the control unit sends the next byte or request without waiting for the acknowledgement of the preceding byte. (The tags Service In and Service Out are alternated with similar tags called Data In and Data Out.) The conventional parallel bus is long enough to act as a delay line that holds a series of data bytes or tags from the control unit and a series of bytes or acknowledging tags from the channel. The number of tags on the two lines creates a difference between the number of bytes or requests that the control unit has sent and the number of acknowledgements that the control unit has received. Commonly, when the difference reaches a predetermined value, the control unit assumes that an error has occurred. This data streaming operation bypasses the buffer and is like data streaming in Fredericks et al.

The combined length of the input bus and the output bus also produces a time delay between sending the first byte or request and receiving the first byte or acknowledgement, and the control unit may have a timer circuit that signals an error when an acknowledgement has not been received within a predetermined time interval.

These delays are typically within the ranges that occur for the length of a serial link in many useful applications. These problems do not occur in the interlocked read data transfer that has been described because the outboard box acknowledges bytes or requests as they are received from the control unit.

To use the buffer of the outboard box for data streaming, the outboard box handles the data streaming bytes in the way already described for an interlocked data transfer, thereby reducing, from the standpoint of the control unit, the time delay and the number of requests and acknowledgements on the link.

14. Other Embodiments

From the description of a preferred embodiment of the invention, those skilled in the art will recognize the application of this invention to data processing systems of differing architecture within the spirit of the invention and the scope of the claims.

We claim:

1. A data processing system having apparatus (22) for interconnecting a parallel bus (26, 27) of a control unit (18) and a serial link (14) of a channel, said apparatus comprising:

means (47) for storing a byte count, a buffer memory (39), a parallel bus (27m) for data to be stored in the buffer memory and a parallel bus (36) for data fetched from the buffer memory, means (30b) connected between said parallel busses of said buffer and connected to said parallel bus of the control unit for handling data transfer operations on said parallel bus according to a predetermined protocol, means (28, 29) connected to said serial link for sending and receiving frames on the serial link, said sending and receiving means including means for converting between a serial format of incoming or outgoing frames on the serial link and a parallel format of the control unit parallel bus and the buffer memory, means interconnecting said buffer memory, said means for handling operations on said parallel bus, and said sending and receiving means and controlling data transfers between said means connected to said serial link and said means for handling operations on said parallel bus, the frame format including a data field and a command field, the command field holding a selected one of a plurality of binary codes signifying the contents of the data field, a first command code signifying a data field containing a byte count for a data transfer and a second command code signifying a data field containing data for controlling the subsequent transfer of data to or from the control unit in an interlocked mode or a non-interlocked mode, and means (37) in said interconnecting and controlling means for decoding the command field of an incoming frame on said serial link and means (41) for transferring a byte count data field in an incoming frame to said byte count storing means.

2. The apparatus of claim 1 including means in said decoding means for decoding a frame signifying whether data in forthcoming data transfer operation is to be stored temporarily in said buffer memory or to bypass said buffer memory and means in said interconnecting means for transmitting data between said control unit and said channel through said buffer memory or bypassing said buffer memory according to information in said signifying frame.

3. The apparatus of claim 2 wherein said signifying frame contains a third command code signifying that the data field contains information for the apparatus, and said means for transmitting data between said control unit and said channel includes means responsive to information in said data field for transmitting data through said buffer or bypassing said buffer.

4. The data processing system of claim 1 wherein said channel includes a frame counter and a buffer and means for updating said frame counter as bytes are transferred and as bytes are acknowledged, whereby on an input operation a predetermined frame counter value signifies that the channel buffer is full and on an output operation a predetermined frame counter value signifies that said buffer memory of said apparatus is full or almost full, means for setting the frame counter to a predetermined value at the beginning of an input or output operation and means for producing an error signal if the frame counter does not contain said predetermined value at the end of the operation, and means for limiting the transfer of data from the channel in response to the value in the frame counter to avoid overrrunning said buffer memory of said apparatus.

5. The data processing system of claim 4 wherein said channel includes a separate channel front end and wherein said channel front end includes means for communicating with the channel on a parallel bus and means for communicating with said apparatus on the serial link and includes said frame counter.

6. The apparatus of claim 1 wherein said interconnecting means includes
means for updating said means for storing a byte count when a byte is transferred from said buffer to said parallel bus of said control unit and
means for forming a serial frame containing a third command code signifying that the data field of the frame contains a byte count and
means for sending the byte count to the channel during a write operation.

7. The apparatus of claim 6 wherein said interconnecting means includes means for calculating the residual count and sending it to the channel in a residual count frame.

8. The apparatus of claim 6 wherein said interconnecting means includes means for forming a frame for signaling to the channel that the apparatus has sent to the control unit a signal (Command Out) to end a read or write operation.

9. The apparatus of claim 6 wherein said interconnecting means includes means in said apparatus for forming a frame for signaling to the channel that more bytes were received and acknowledged by the control unit than required by the count sent to the apparatus by the channel.

* * * * *